(12) United States Patent
Neumann

(10) Patent No.: US 11,117,076 B2
(45) Date of Patent: Sep. 14, 2021

(54) REMOVABLE RAINWATER DOWNSPOUT FILTER

(71) Applicant: Horst Neumann, Duncan (CA)

(72) Inventor: Horst Neumann, Duncan (CA)

( * ) Notice: Subject to any disclaimer, the term of this patent is extended or adjusted under 35 U.S.C. 154(b) by 0 days.

(21) Appl. No.: 16/685,035

(22) Filed: Nov. 15, 2019

(65) Prior Publication Data

US 2020/0078711 A1 Mar. 12, 2020

(51) Int. Cl.
*B01D 29/35* (2006.01)
*B01D 29/96* (2006.01)
*B01D 39/10* (2006.01)
*E04D 13/08* (2006.01)
*C02F 1/00* (2006.01)
*C02F 103/00* (2006.01)

(52) U.S. Cl.
CPC ............ *B01D 29/35* (2013.01); *B01D 29/96* (2013.01); *B01D 39/10* (2013.01); *C02F 1/001* (2013.01); *E04D 13/08* (2013.01); *C02F 2103/001* (2013.01); *E04D 2013/086* (2013.01)

(58) Field of Classification Search
CPC ........ B01D 29/35; B01D 29/96; B01D 39/10; E04D 13/08; E04D 2013/086; E04D 2013/0866; C02F 1/001; C02F 2103/001; C02F 2307/08
USPC .......................................................... 210/153
See application file for complete search history.

(56) References Cited

U.S. PATENT DOCUMENTS

| | | | | |
|---|---|---|---|---|
| 522,667 A * | 7/1894 | Minnemeyer | ......... | B01D 35/02 210/447 |
| 608,765 A * | 8/1898 | Epple | ...................... | E04D 13/08 137/873 |
| 1,076,075 A * | 10/1913 | Steele | .................... | B01D 35/02 210/447 |
| 1,383,547 A * | 7/1921 | Konsalik | ................. | E04D 13/08 210/314 |
| 3,550,381 A * | 12/1970 | South | .................. | E04D 13/0727 405/119 |
| 4,470,908 A * | 9/1984 | Odekirk | ................. | B01D 35/00 210/463 |
| 5,230,798 A * | 7/1993 | Rogman | ................ | B01D 29/23 210/447 |
| 7,895,793 B1 * | 3/2011 | Yates | ...................... | E04D 13/08 52/12 |

(Continued)

FOREIGN PATENT DOCUMENTS

BE 1011223 A3 * 6/1999 ............. E04D 13/08

OTHER PUBLICATIONS

Aquabarrel Sentry, Multifuction Downspout Filter and Diverter All-In-One Kit: Open Top, 2016, pp. 1-4 (Year: 2016).*

(Continued)

*Primary Examiner* — Nam X Nguyen
*Assistant Examiner* — Ekandra S. Miller-Cruz
(74) *Attorney, Agent, or Firm* — The Webb Law Firm

(57) ABSTRACT

There is provided a removable downspout filter for installation into a downspout. The removable downspout filter includes a filter basket with attached face plate. The face plate includes side flaps configured to wrap around the downspout when the downspout filter is installed and is generally configured to blend in with the downspout. Also provided is a downspout with installed filter and kits including the same.

12 Claims, 5 Drawing Sheets

(56) References Cited

U.S. PATENT DOCUMENTS

| | | | | |
|---|---|---|---|---|
| 8,029,667 | B2* | 10/2011 | Santinon | B01D 35/30 |
| | | | | 210/172.6 |
| 8,646,217 | B2* | 2/2014 | Ratajac | E04D 13/076 |
| | | | | 52/12 |
| 9,416,543 | B1* | 8/2016 | Fox | E04D 13/0767 |
| 10,077,556 | B2* | 9/2018 | Saleh | E04D 13/064 |
| 2005/0109693 | A1 | 5/2005 | Allard | |
| 2011/0100887 | A1 | 5/2011 | Ballistreri | |
| 2014/0054245 | A1 | 2/2014 | Loesche | |

OTHER PUBLICATIONS

"Downspout Clean-Out", Raindrop Gutter Guard Systems, 2014, retrieved from https://raindropgutterguard.com/products/downspout-clean-out/.

* cited by examiner

REMOVABLE RAINWATER DOWNSPOUT FILTER

FIELD OF THE INVENTION

This invention pertains generally to rainwater gutters and downspouts and, more particularly, to a removable rainwater downspout filter.

BACKGROUND OF THE INVENTION

Gutters and associated downspouts are often installed on residential and commercial buildings to carry rain water off the roof. Debris on the roof or in the gutters including leaf debris can be carried by the rainwater and clog both the gutters and the downspouts. Downspout debris filters and downspout basket strainers are known in the art include filters into which the downspout is inserted including those disclosed in U.S. Patent Application Publication Nos. 20050109693, 20110100887, and 20140054245. Other downspout clean-outs including those available at https://raindropgutterguard.com/products/downspout-clean-out/ are known in the art. Generally, available downspout debris filters are large and unsightly. There exists a need in the art for a simplified downspout filter that can blend in with downspout.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a removable rainwater downspout filter. In accordance with an aspect of the present invention, there is provided a removable rainwater downspout filter.

In accordance with another aspect of the invention, there is provided a removable downspout filter for installation into a downspout, the removable downspout filter comprising a filter basket with attached face plate, wherein the face plate comprises side flaps configured to wrap around the downspout when the downspout filter is installed.

In accordance with another aspect of the invention, there is provided a filtered downspout comprising a section of downspout with the removable downspout filter of the invention.

In accordance with another aspect of the invention, there is provided a kit comprising the removable downspout filter of the invention and instructions for use.

BRIEF DESCRIPTION OF THE DRAWINGS

These and other features of the invention will become more apparent in the following detailed description in which reference is made to the appended drawings.

FIG. 3 shows downspout 50 prepared for installation of the removable downspout filter 10 with cut flaps 55 folded in.

DETAILED DESCRIPTION OF THE INVENTION

Figure 1:
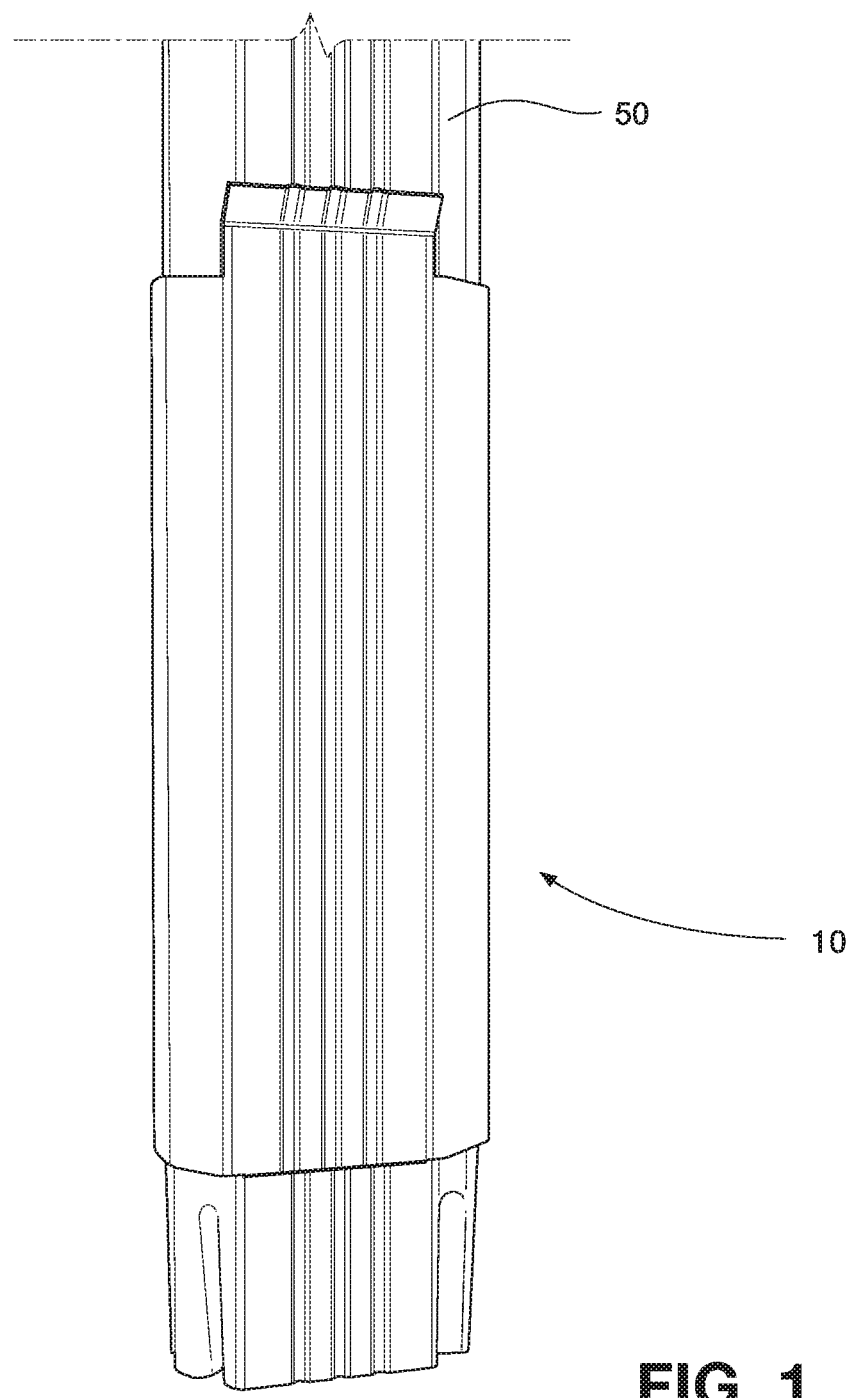
FIG. 1 shows the removable downspout filter 10 installed in a standard downspout 50. Optionally, the lower edges of the downspout can be crimped as shown in the figure.
Figure 2:
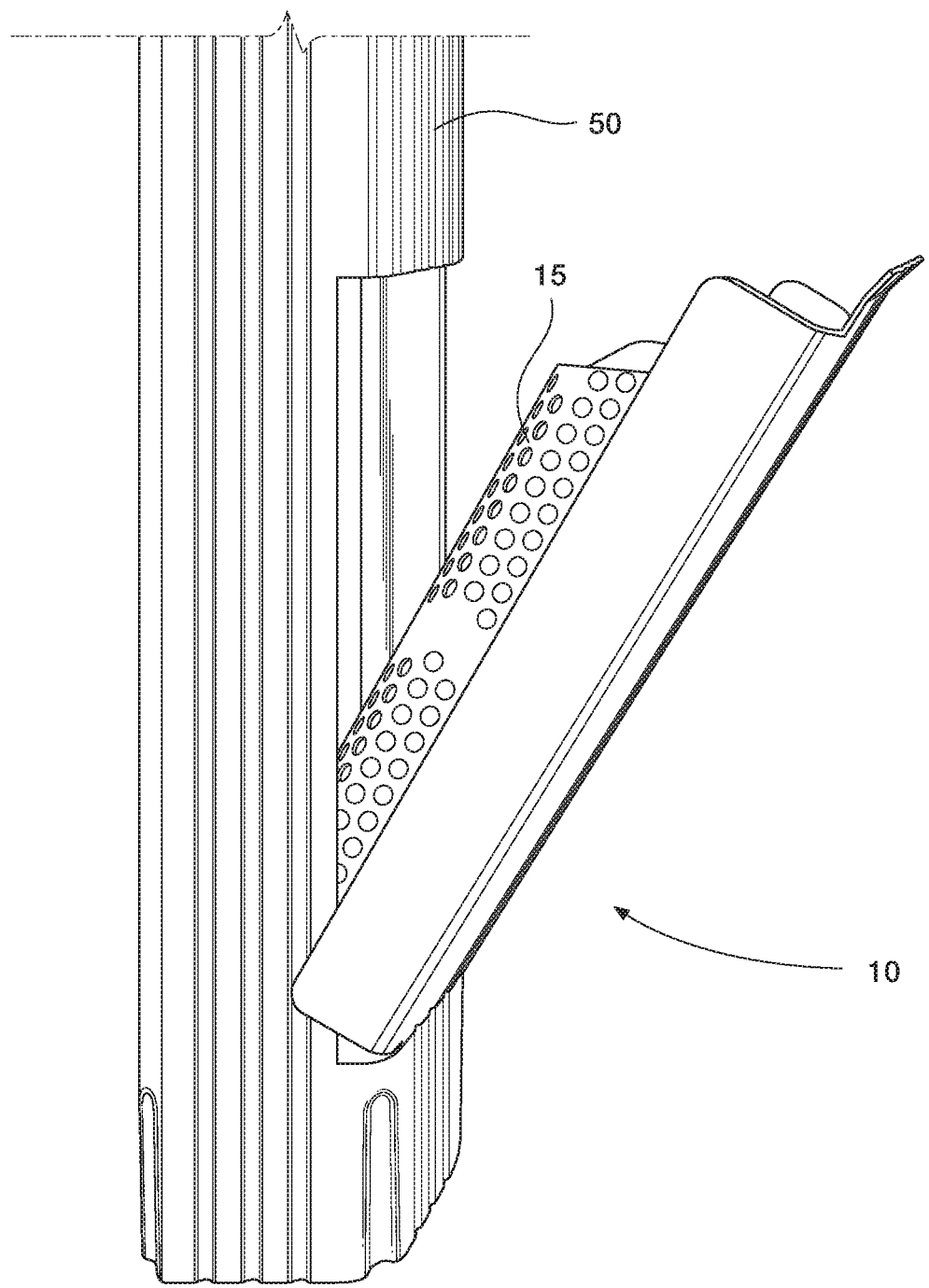
FIG. 2 shows the removable downspout filter 10 and downspout 50 of FIG. 1 where the downspout filter is pivoted forward to allow for removal of debris from the filter basket 15.
Figure 3:
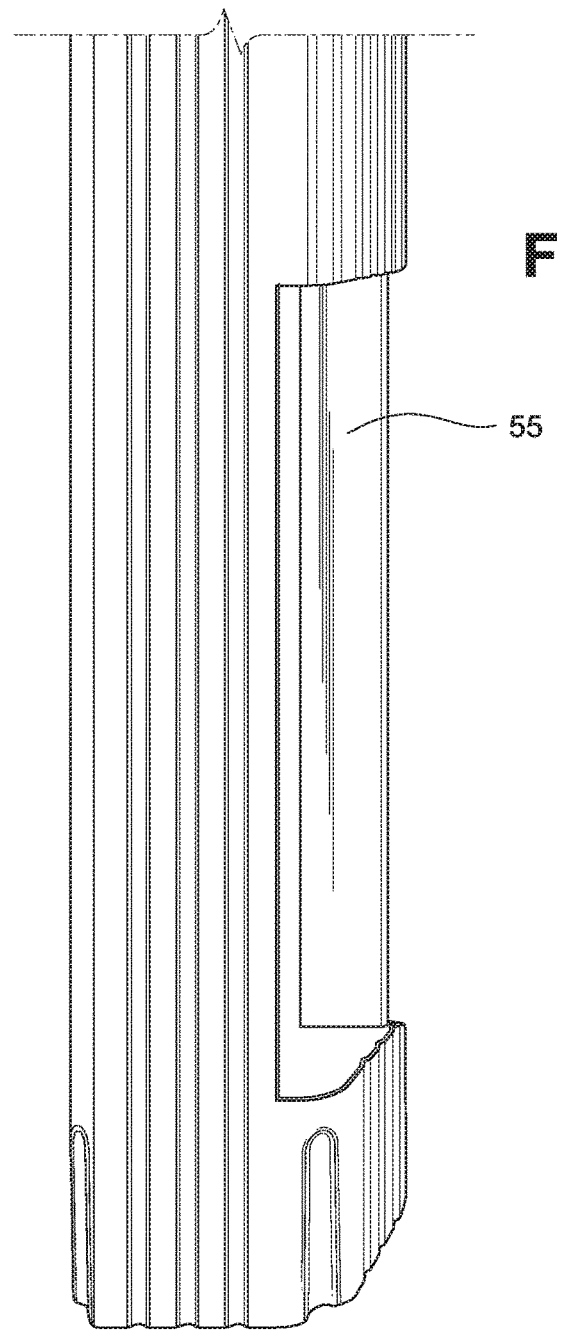
Figure 4:
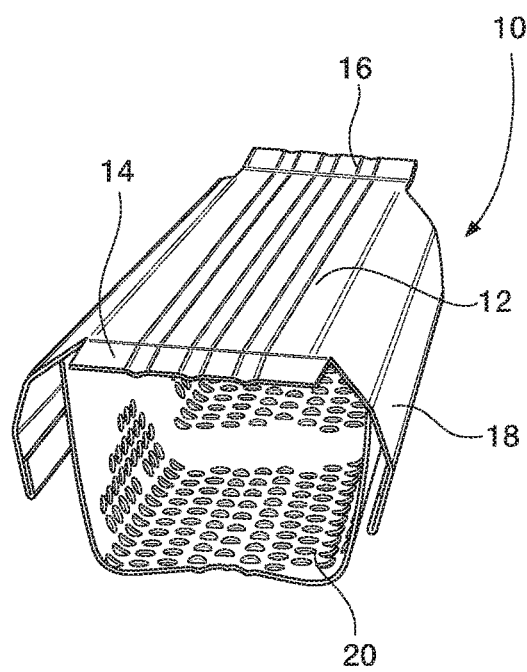
FIG. 4 shows the removable downspout filter 10 with faceplate 12 with pivot flap 14, handle flap 16 and side flaps 18. Also shown is the filter basket 20.
Figure 5:
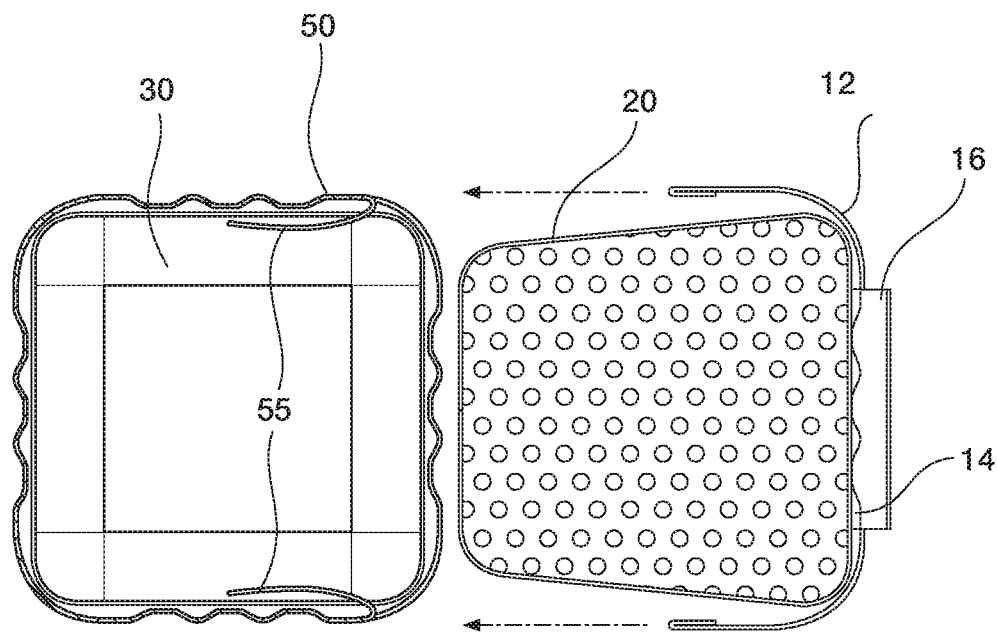
FIG. 5 shows a cross section of a downspout 50 with funnel element 30. The folded-in cut flaps 55 below the funnel element 30 would only be visible if the funnel element was manufactured from clear material. Also shown is the removable downspout filter 10.
Figure 6:
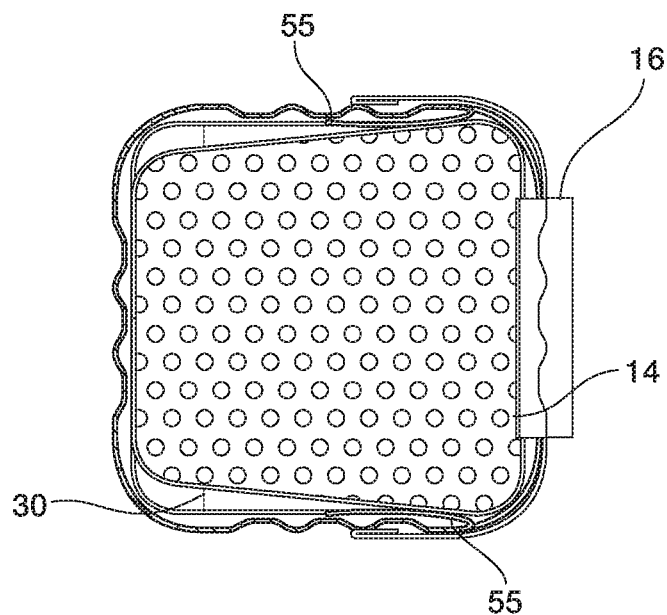
FIG. 6 shows a cross section of a downspout 50 with funnel element 30 and installed downspout filter 10.
Figure 7:
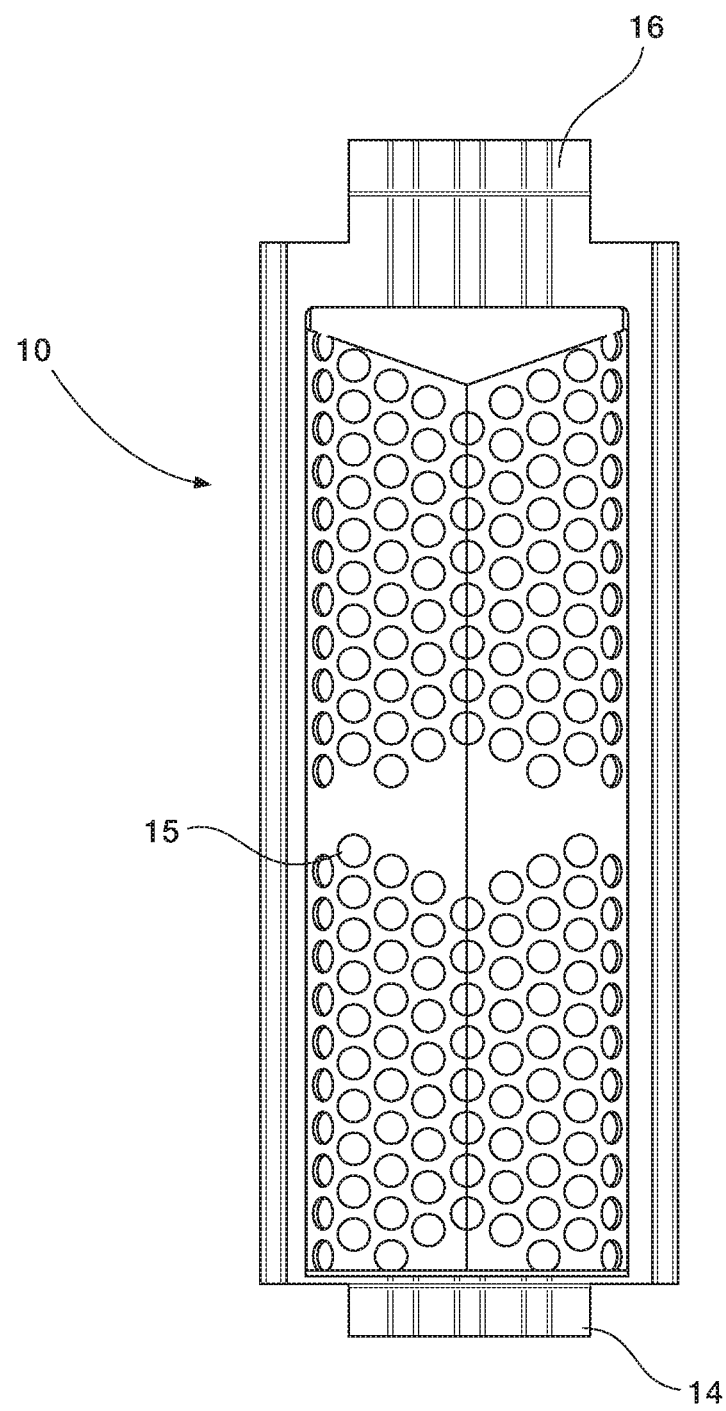
FIG. 7 shows a view of the back of the removable downspout filter 10 with filter basket attached to the face plate.

Referring to FIGS. 1 to 7, the present invention provides a downspout cleanout that catches debris washed into the downspout by rainwater. The downspout cleanout includes a downspout filter 10 installed in an appropriately sized opening in a standard downspout 50 manufactured from aluminum including mill finish aluminum and corrugated aluminum and plain aluminum or other appropriate materials known in the art including copper, painted steel, plastic including both molded and extruded, galvanized steel, Galvlume, copper penny aluminum, Euro Copper and vinyl.

The opening in the downspout 50 is formed by creating inwardly folding flaps out of a segment of the front face of downspout. The inwardly folding flaps are created by cutting two horizontally spaced lines across the front face of downspout and a single vertical line between the two horizontally spaced lines in the middle of front face of the downspout. The resulting flaps are folded in. The folded-in flaps help hold the downspout filter in place by applying friction to the side surfaces of an installed downspout filter 10.

A funnel element 30 is fitted in the downspout above the location for the installed downspout filter 10 to funnel water into the downspout filter 10 when the downspout filter is installed. The funnel element 30 may be made of aluminum, plastic or other appropriate material as would be known in the art. The funnel element 30 is optionally fixed in place within the downspout by methods known in the art.

The downspout filter 10 comprises a filter basket 20 with faceplate 12. The downspout filter can be manufactured from any material from which the downspout is manufactured. In some embodiments, the filter basket 20 is perforated metal. In other embodiments, the filter basket is made of mesh. The size of the perforation or mesh is such that it allows for the passage of water while trapping debris. The bottom face and at least one other face of the filter basket are perforated and/or manufactured from mesh material. In some embodiments, the filter basket is perforated or made of mesh on all sides. In some embodiments, the face of the filter basket which is fixed to the face plate does not include perforations.

The size of the filter basket is dependent on the size of the downspout such that the cross section of the filter basket is sufficient to ensure all rainwater from the funnel element passes through the filter basket and that at least a portion of the sides of the filter basket frictional engage the folded-in flaps of the downspout. In some embodiments, the sides of the filter basket taper such that the cross section at the bottom is smaller than the cross section at the top of the basket. In some embodiments, the filter basket has a cross section that is generally trapezoidal in shape, optionally with rounded corners. In some embodiments where the filter basket has a generally trapezoidal cross section, the longest of the parallel sides is proximal to the front of the downspout.

The filter basket 20 is attached or bonded to a face plate. The face plate includes a lower pivot flap 14, handle flap 16 and side flaps 18. In some embodiments, the pivot flap 14 is a narrow extension of the face plate bent at an angle to facilitate placement in the downspout opening. In these embodiments, the lower cut edge of the downspout opening acts as a fulcrum to facilitate inspection and/or removal of the downspout filter.

The faceplate further includes a handle flap 16. In some embodiments, the handle flap 16 is a narrow extension of the face plate optionally with a bent top portion.

The faceplate further includes side flaps 18 that extend from the sides of the face plate. The side flaps are curved such that when installed the flaps curve around the edge of the downspout such that the downspout filter is held in place by frictionally engaging the sidewalls of the downspout between the side walls of the filter basket and the side flaps.

Optionally, the faceplate is reinforced. In some embodiments, the pivot flap and/or handle flap is extended and folded over to reinforce the faceplate.

In some embodiments, a kit including a removable downspout filter and installation instructions is provided. Optionally, the kit may further include the funnel element 30 for installation into a downspout.

In alternative embodiments, a segment of downspout with funnel element and a removable downspout filter is provided for installation into existing downspouts or for connection to other downspout pieces. The segment is optionally provided with a crimped lower edge to facilitate installation. Optionally, the segment of downspout with installed filter basket is provided in a kit with installation instructions.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The invention claimed is:

1. A removable downspout filter for installation into a downspout, the removable downspout filter comprising a filter basket with attached face plate, wherein the face plate comprises side flaps configured to wrap around the downspout and hold the removable downspout filter in place when the removable downspout filter is installed by frictionally engaging (1) a plurality of sidewalls of the downspout by the side flaps and (2) folded in flaps of the downspout by a plurality of sidewalls of the filter basket.

2. The removable downspout filter of claim 1, wherein the face plate comprises a pivot flap.

3. The removable downspout filter of claim 2, wherein the pivot flap is a bent narrow extension of the face plate.

4. The removable downspout filter of claim 3, where the face plate comprises a handle flap.

5. The removable downspout filter of claim 4, wherein the handle flap is a bent narrow extension of the face plate.

6. The removable downspout filter of claim 1, wherein the filter basket is manufactured from perforated metal.

7. The removable downspout filter of claim 1, wherein the filter basket is mesh.

8. The removable downspout filter of claim 1, wherein the face plate is configured to resemble a downspout.

9. A filtered downspout comprising a section of downspout with the removable downspout filter of claim 5 installed therein.

10. The filtered downspout of claim 9, comprising a funnel element installed in the section above the removable downspout filter.

11. The filtered downspout of claim 10, wherein the removable downspout filter is held in place by the folded in flaps of a portion of the section of the downspout.

12. A kit comprising the removable downspout filter of claim 5 and instructions for use.

* * * * *